United States Patent [19]

Weber et al.

[11] 4,161,694

[45] Jul. 17, 1979

[54] RADIO RELAY CHANNEL BRANCH CASCADE EXHIBITING UNIFORM TRANSIT-TIME-AND-ATTENUATION-CHARACTERISTICS OF ALL CHANNELS

[75] Inventors: Hans-Werner Weber, Darmstadt; Hermann Vollhardt, Munich, both of Fed. Rep. of Germany

[73] Assignee: Siemens Aktiengesellschaft, Berlin & Munich, Fed. Rep. of Germany

[21] Appl. No.: 809,807

[22] Filed: Jun. 24, 1977

[30] Foreign Application Priority Data

Jun. 28, 1976 [DE] Fed. Rep. of Germany ....... 2628906

[51] Int. Cl.² ................ H04B 7/14

[52] U.S. Cl. ................ 325/1; 325/3

[58] Field of Search ................ 325/1, 3, 9, 12; 343/176, 200, 202; 179/15 FD

[56] References Cited

U.S. PATENT DOCUMENTS

| | | | |
|---|---|---|---|
| 3,273,064 | 9/1966 | Künemund | 343/200 |
| 3,411,088 | 11/1968 | Hutchison | 325/3 |
| 3,636,452 | 1/1972 | Nuding | 325/1 |
| 3,742,149 | 6/1973 | Yoshida et al. | 343/200 |
| 3,865,990 | 2/1975 | Kuenemund | 325/3 |
| 3,974,448 | 8/1976 | Baum | 325/1 |

*Primary Examiner*—Robert L. Griffin
*Assistant Examiner*—Michael A. Masinick
*Attorney, Agent, or Firm*—Hill, Van Santen, Steadman, Chiara & Simpson

[57] ABSTRACT

A multi-channel radio relay system in which a plurality of high-frequency channels are provided in a link between a transmitting station and a receiving station, said channels being combined to form a high-frequency group, and separated at the receiving end, utilizing therefor, at each station, a cascade circuit of channel branch elements, which comprise circulators and band-pass filters, in which one of the two edge channels located at the respective upper and lower edges of the frequency band to be transmitted, at the transmitting end, is assigned to the channel branch element furthest from the antenna terminal thereat, and the other of such two edge channels, at the receiving end, is assigned to the channel branch element furthest from the antenna terminal thereat, with the band-pass filters of the respective channel elements for the two edge channels being detuned, with respect to their middle frequencies, relative to the middle frequency of their assigned edge channels, by an amount Δ f, in the direction of the middle frequency of the respective channel adjacent in frequency position.

2 Claims, 5 Drawing Figures

Fig.1
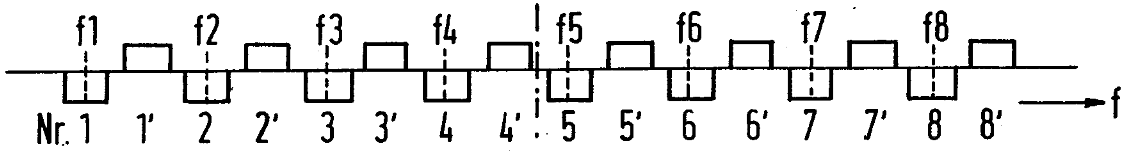
Fig.2
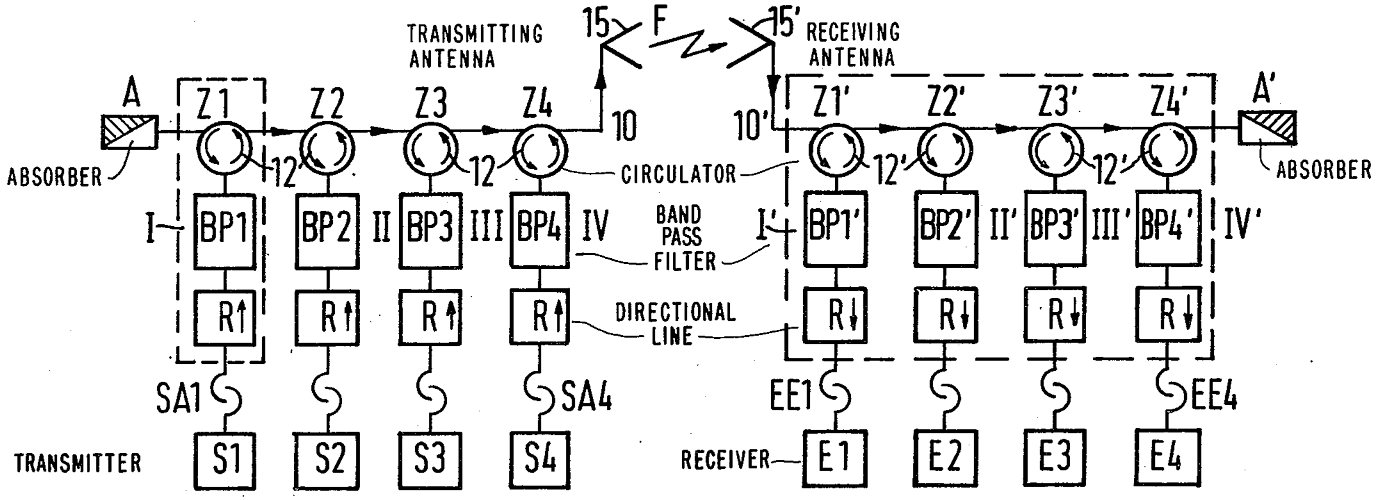
Fig.3
| | | | | | | | | |
|---|---|---|---|---|---|---|---|---|
| 1 | 2 | 3 | 4 | | 1 | 2 | 3 | 4 |
| 1 | 3 | 2 | 4 | | 1 | 3 | 2 | 4 |
| f1+Δf | f2/f3 | f3/f2 | f4 | | f1 | f2/f3 | f3/f2 | f4-Δf |
| 4 | 3 | 2 | 1 | | 4 | 3 | 2 | 1 |
| 4 | 2 | 3 | 1 | | 4 | 2 | 3 | 1 |
| f4-Δf | f3/f2 | f2/f3 | f1 | | f4 | f3/f2 | f2/f3 | f1+Δf |

RADIO RELAY CHANNEL BRANCH CASCADE EXHIBITING UNIFORM TRANSIT-TIME-AND-ATTENUATION-CHARACTERISTICS OF ALL CHANNELS

BACKGROUND OF THE INVENTION

The invention relates to a multi-channel radio relay system, employing a plurality of frequency channels in which both at the transmitting station and at the receiving station a plurality of adjacent high-frequency channels are combined to form a common, high-frequency group, over a cascade circuit comprising channel branch elements including circulators and band-pass filters.

In accordance with known techniques, the transmission of communication channels in the micro-wave frequency band is based on predetermined frequency plans, in accordance with which the high-frequency groups are divided into individual channels. An essential feature governing the construction of transmission links is that the entire high-frequency group be transmitted across a radio field with only a single transmitting antenna and a single receiving antenna. At the transmitting end, the individual frequency channels are combined over branch circuits and supplied to the transmitting antenna, whereas at the receiving end the individual channels are again separated over branch circuits which, for example, are of a construction similar to those at the transmitting end. If the individual channels were combined and separated in the associated branch circuits without special measures, different transit time characteristics would occur with respect to the individual channels, necessitating the use of substantially differing types of transit time correctors in order to compensate for the different transit times.

German Pat. No. 1,260,562 is directed to at least partially eliminating these difficulties and discloses a radio system having a radio relay link, in which it is assured that the sequence of connection of the individual channels for the receiving-end channel branch cascade is the reverse of that for the associated transmitting-end channel branch cascade. With this arrangement, the number of total reflections and the number of filter flanks which together determine transit time distortions on the transmission path from transmitter to receiver, for each individual channel, is equal to the number of total reflections and the number of active filter flanks of all other channels. In a radio system of this special design, although the transit time distortions of the middle channels in the frequency position are equal to one another, the transit time characteristics are only approximately equal for the edge channels. This creates a problem which is particularly disturbing when it is important to utilize identical transit time correctors at the intermediate frequency level for all channels.

In an effort to eliminate these difficulties, German OS 2,213,962 discloses a radio system having a radio relay link, in which a specific sequence of the individual channel branch elements, assigned to the particular high-frequency channels, is provided and in which the direction of circulation of two circulators is opposite to that of the other circulators. Furthermore, a resonator is provided in such case which in the frequency range from the lowest to the highest frequency channel simulates the transit time characteristics produced by the adjacent channel branch in the frequency position homologously to the middle band frequency of such channel.

As a result of this specific design of a radio system, although a transit time distortion and attenuation distortion which is equal and symmetrical for all channels is achieved, the channel branch elements for the edge channels differ from the other channel branch elements, and as a result it is not possible to employ standard assemblies. Furthermore, the micro-wave resonator and the adjustment necessitated thereby results in a generally undesirably high cost outlay.

BRIEF SUMMARY OF THE INVENTION

The invention therefore has among its objectives the elimination of the difficulties previously experienced and to provide an arrangement by means of which there is achieved a transit time distortion and attenuation distortion which is identical for all channels, in particular, which is symmetrical with respect to the edge channels, and furthermore can be achieved with a reduction in the outlay previously required.

Proceeding from a radio system having a radio relay link in which both at the transmitting station and at the receiving station a plurality of adjacent high-frequency channels are combined to form a common high-frequency group over a cascade circuit comprising channel branch elements having circulators and band-pass filters, this objective is achieved, in accordance with the invention, by the assignment, at the transmitting end, of one of the edge channels located at the upper or lower edge of the frequency range which is to be transmitted, to that channel branch element which is disposed furthest from the antenna terminal and the other edge channel is, at the receiving end, assigned to that channel branch element which lies furthest from the antenna terminal, and, in addition, with the band-pass filters of the channel branch elements at the transmitting and receiving ends which are disposed furthest from the associated antenna terminals being detuned with respect to their middle frequency, relative to the middle frequency of their assigned edge channels, by a quantity $\Delta f$ in the direction of the middle frequency of the adjoining channels in the particular frequency position.

BRIEF DESCRIPTION OF THE DRAWINGS

In the drawings wherein like reference characters indicate like or corresponding parts:

FIG. 1 schematically illustrates the channel plan of a radio relay band;

FIG. 2 schematically illustrates the construction of channel branch cascades of a radio link;

FIG. 3 is a chart or plan of the channel division and of the tuning of the middle band-pass frequencies in correspondence to the invention, for a radio band such as illustrated in FIG. 1;

DETAILED DESCRIPTION OF THE INVENTION

Figure 4:
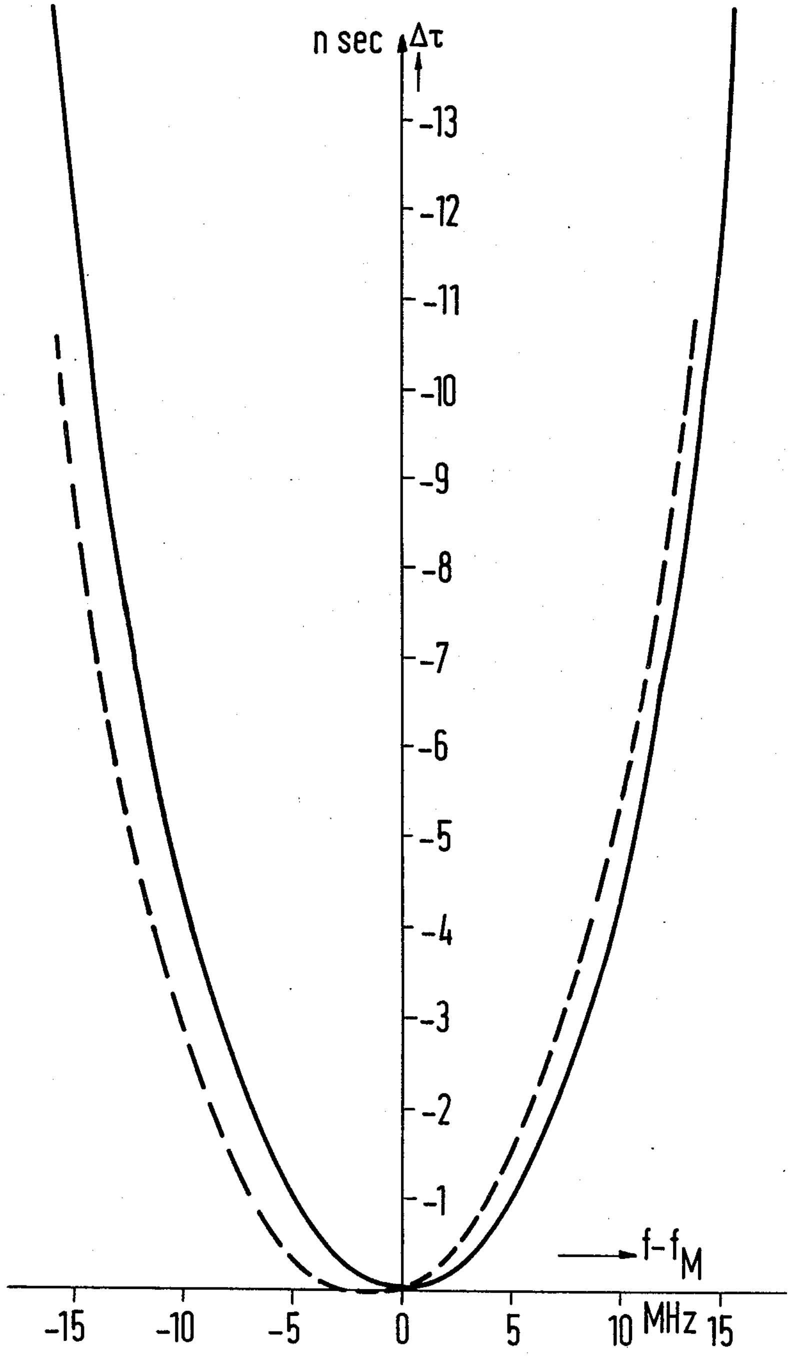
FIG. 4 illustrates the transit time distortion for one of the middle channels, and a non-corrected edge channel of channel branch cascades of a conventional system.

Referring to FIG. 1, there is illustrated the channel plan of a radio relay band as currently employed for a system in the region of 6 GHz. A frequency band from approximately 5900 to approximately 6400 MHz contains eight high-frequency channels 1 to 8 having middle frequencies f1 to f8 and with each channel having a width of approximately 32 MHz and spaced from one another with a middle frequency spacing of approximately 59 MHz. Generally, within a radio band only channels from the group comprising the lower four channels or the group comprising the upper four channels are utilized.

Where a radio relay system comprises a plurality of radio links, an undesired loop formation in the relay station which connects consecutive radio links is generally avoided, for example, by employing the four lower frequency channels for the first radio link, as considered in the transmission direction, the four higher frequency channels in the following radio link, the four lowest channels in the next radio link, etc. To provide additional decoupling between individual channels, frequently such decoupling is effected by means of different polarization directions, for example, for channels 1' to 8' in FIG. 1, to achieve additional decoupling between the individual channels.

FIG. 2 schematically illustrates one possible construction of a radio link, which is basically already disclosed in the previously referred to German Pat. No. 1,260,562. In this radio link, the channels 1, 2, 3 and 4 which emanate from a modulation device or transmitters S1 to S4, and exhibiting middle band frequencies f1, f2, f3 and f4 are combined to form a high-frequency group which is conducted from the antenna terminal 10 to a transmitting antenna 15. Such combination is effected over individual channel branch elements I, II, III and IV, each of which comprises a band-pass filter BP1 and a circulator Z. Expediently, each band-pass filter is also preceded by a directional line R.

The channel branch element I thus contains the band-pass filter BP1 which is tuned to the channel frequency f1 of the channel 1 and whose output extends to a circulator Z1. The other channel branch elements II, III and IV are of like construction whereby the band-pass filter BP2 is tuned to the frequency f2 of the channel 2, the band-pass filter BP3 is tuned to the frequency f3 of the channel 3 and the band-pass filter BP4 is tuned to the frequency f4 of the channel 4. The circulation direction of the individual circulators Z1 to Z4 is indicated by the arrows, designated by the reference numeral 12, and so selected that the individual channel is totally reflected at the outputs of the subsequently connected band-pass filters. An absorber A is connected to the free terminal of the circulator which is disposed furthest from the antenna.

At the receiving station, a corresponding construction is provided in which the assemblies corresponding to those of the transmitting station have been provided with the same reference characters with the addition of a prime symbol. As a result of the channel separation effected at the receiving end, the channel 1 is available at the output of the channel branch element I' and accordingly the channels 2, 3 and 4 are available at the outputs of the corresponding other channel branch elements. Conversion to the intermediate frequency level is then effected in the corresponding receivers E1 to E4.

To keep the transmission attenuation between the particular transmitter output SA and the associated receiver input EE as low as possible, the transit time distortions $\Delta\tau_S$ are not compensated until the high-frequency channels 1 to 4 have been converted to the intermediate frequency level. On the transmission path from transmitter to receiver, the high-frequency signals of the middle channels of the channel branch cascade are reflected both on a band-pass filter of an adjoining upper frequency and on a band-pass filter of an adjoining lower frequency. Considering the edge channels 1 and 4 which lie at the upper and lower ends of the frequency band employed, the middle frequency of all the adjacent band-pass filters lie either below or above the middle frequencies f1 and f4 of the edge channels. When passing through the pass ranges of the associated band-pass filters, the high-frequency band of each channel undergoes a transit time distortion and attenuation distortion which is symmetrical to the middle frequency, whereas the reflection on the filter flank of an adjacent channel produces a transit time distortion and attenuation distortion which is asymmetrical to its middle frequency. The superimposition of the oppositely directed slopes produces a symmetrical transit time distortion and attenuation distortion for the middle channels. However, as the reflective adjoining channels are located only on one side with respect to frequency, the edge channels obtain a transit time and an attenuation slope which rises in the direction of the frequency of the adjoining channels, and which is added to the symmetrical distortion of the band-pass filter paths.

Generally, distortion correctors at the 1F level of the receivers are employed for correcting transit time distortions. However, these heretofore necessarily have required different tuning for the middle channels and the edge channels, and in order to avoid this condition, a transit time distortion and attenuation distortion is to be achieved which is identical and symmetrical with respect to all channels.

FIG. 3 illustrates a plan which supplements FIG. 2, in which a plurality of possibilities of dividing the individual channels for the channel branch elements are illustrated. Also is illustrated the requisite tuning of the middle frequency of those band-pass filters which are disposed in channel branch elements located furthest from the antenna terminals in accordance with the theory of the present invention.

The top row of the plan illustrates a first possibility of channel distribution which corresponds with that illustrated in FIG. 2, in which the lower edge channel 1 is, at the transmitting end, assigned to the channel branch element I which is disposed furthest from the antenna input, and the upper edge channel 4 is, at the receiving end, assigned to the channel branch element IV' which likewise is located furthest from the associated antenna terminal. In this first possibility, the distribution of the middle channels is selected in accordance with German Pat. No. 1,260,562 wherein the sequence of the channels in the receiving-end channel branch cascade is reversed to that in the associated transmitting-end channel branch cascade. Thus, the signal of each of such channels passes through the same number of circulators and thereby acquires the same attenuation. In this first possibility, the channels at the transmitting end are distributed among the channel branch elements in a sequence which rises in frequency. The middle band-pass frequencies of the channel branch elements II and III assigned to the middle channels 2 and 3 are precisely set to the middle frequencies f2 and f3 of the middle channels 2 and 3. However, to apply the principles of the present invention to such arrangement, the band-pass filter BP1 of the transmitting end channel branch element I is detuned with respect to the middle frequency f1 of the channel 1 by an amount Δf in the direction of the middle frequency f2 of the channel 2 which is adjacent in frequency. In the same way, the band-pass filter BP4' of the channel branch element IV', which, at the receiving end, lies furthest from the antenna terminal, is detuned relative to the middle frequency f4 of the highest edge channel 4 by an amount Δf in the direction of the middle frequency f3 of the channel 3 which is adjacent in frequency to the channel 4. By this expedience, the transit time and attenuation slope of the edge channels is to a large extent compensated whereby the resultant transit time distortion and attenuation distortion is rendered symmetrical to the pertinent channel middle frequency.

In comparison to the first possibility above-described, the assignment of channels 2 and 3 may be effected in accordance with the second row of FIG. 3 in which the channel branch elements II and III and II' and III' have been interchanged. The third row illustrates the tuning frequencies of the band-pass filters contained in the channel branch elements for the first two channel division possibilities illustrated.

The fourth row of the plan illustrates a third channel division possibility for the edge channels, in which the edge channels are interchanged as compared with the first two possibilities described. In this case, the upper edge channel 4 is assigned to the channel branch element I which at the transmitting end lies furthest from the antenna terminal. In accordance with the present invention, the middle frequency of the band-pass filter of the channel branch element I is reduced with respect to the channel middle frequency f4 of the channel 4 by the amount Δf whereas the band-pass filter of the receiving end channel branch element IV' must be increased in relation to the channel middle frequency f1 of the channel 1 by an amount Δf.

The fifth column of the plan illustrates a fourth possibility of dividing the channels, wherein, in comparison to the third possibility, the middle channels 2 and 3 are again interchanged. This merely involves altering the tuning of the middle channel branch elements 2 and 3 and 2' and 3', whereas the tuning of the other channel branch elements remains unchanged in relation to the third possibility.

FIG. 4 illustrates the transit time distortion for one of the middle channels and one of the edge channels, without frequency correction of channel branch cascades, of a conventional radio relay system in the 6 GHz frequency range, in which the transit time distortion of the middle channel, which is symmetrical to the middle frequency $f_M$, is illustrated in solid lines, while the corresponding transit time distortion for the edge channel is illustrated in broken lines. As will be readily apparent from the figure, the transit time distortion for the uncorrected edge channel is displaced by approximately 2MHz relative to the position of the middle channel, which is symmetrical to the middle frequency.

Figure 5:
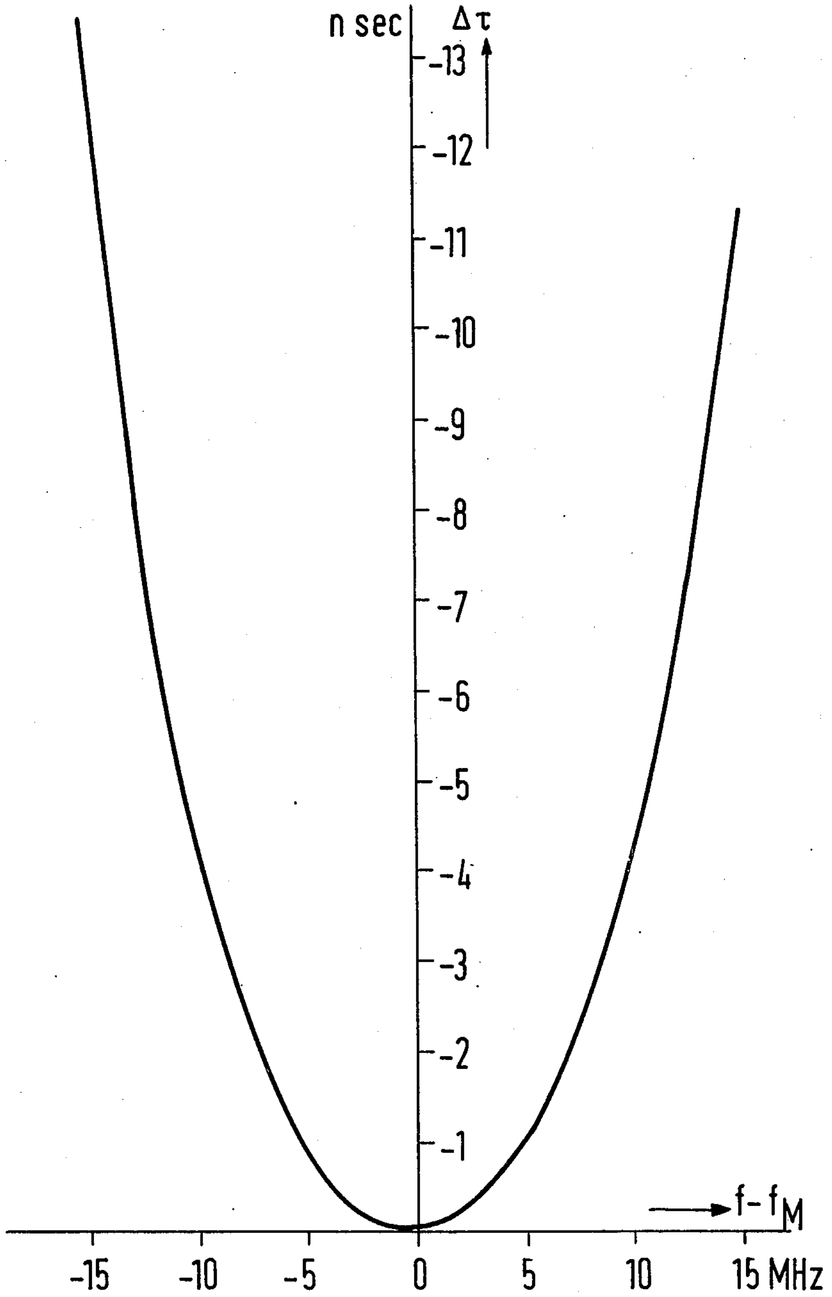
FIG. 5 illustrates the transit time distortion of an edge channel for the channel distribution and tuning of the middle band-pass frequencies corresponding to the invention.

FIG. 5 illustrates the transit time distortion of an edge channel corresponding to FIG. 4, in which a frequency correction, in accordance with the invention, has been effected which, in the example illustrated, is in the amount $\Delta f = 2.8$ MHz. As a result, the transit time distortion of the edge channel is substantially identical to the corresponding curve for the middle channels. As the characteristics of the attenuation curves are identical to those of the transit time curves, the invention has been explained merely with reference to the transit time curves.

Having thus described our invention, it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. A multi-channel radio relay system in which a plurality of high-frequency channels are provided in a link between a transmitting and a receiving station, said channels being combined at the transmitting station to form a common high-frequency group over a cascade circuit comprising channel branch elements, each of which contains a circulator and a band-pass filter, and separated at the receiving station over a similar cascade circuit, the allocation of frequencies being such that each channel passes over an equal number of circulators in said link, the edge channel of highest frequency being allotted to the circulator, of one of said cascades, most remote from the antenna associated therewith, and with the circulator, of the other cascade, closest to the antenna associated therewith, the edge channel of lowest frequency being allocated to the circulator of each cascade at the opposite end to that allotted to the highest frequency, all of said circulators being similarly arranged in their respective cascades, the band-pass filter of each cascade connected to the circulator most remote from the associated antenna being detuned by an amount Δf, from its middle channel frequency in the direction of the middle frequency of the channel adjacent in frequency position, and the remaining band-pass filters being tuned to the middle frequency of the channel involved.

2. A system according to claim 1, wherein the amount Δf of the detuning is less than the band width employed in such edge channel.

* * * * *